United States Patent [19]

Tarbutton et al.

[11] Patent Number: 4,772,645

[45] Date of Patent: Sep. 20, 1988

[54] EPOXY RESIN COMPOSITION

[75] Inventors: Kent S. Tarbutton, Lake Elmo; Janis Robins, St. Paul; John C. Tangen, Glenwood, all of Minn.

[73] Assignee: Minnesota Mining and Manufacturing Company, St. Paul, Minn.

[21] Appl. No.: 132,709

[22] Filed: Dec. 11, 1987

Related U.S. Application Data

[63] Continuation of Ser. No. 860,511, May 7, 1986, abandoned.

[51] Int. Cl.$^4$ .................. C08G 59/62; C08G 59/68
[52] U.S. Cl. .................... 523/457; 525/85; 525/108; 525/122; 525/504; 528/92; 528/94; 528/103; 528/110; 528/406
[58] Field of Search .............. 528/92, 94, 110, 406, 528/103; 523/457; 525/108, 122, 504, 85

[56] References Cited

U.S. PATENT DOCUMENTS

| | | | |
|---|---|---|---|
| 3,496,250 | 2/1970 | Czerwinski | 260/836 |
| 3,553,166 | 1/1971 | Anderson et al. | 260/47 |
| 3,677,978 | 7/1972 | Dowbenko et al. | 260/2 |
| 3,912,689 | 10/1975 | Bechara et al. | 260/75 |
| 4,101,514 | 7/1978 | Thom | 528/109 |
| 4,107,116 | 8/1978 | Riew et al. | 525/122 X |
| 4,140,703 | 2/1979 | Darms et al. | 260/346 |
| 4,160,081 | 7/1979 | Kvita et al. | 528/93 |
| 4,233,220 | 11/1980 | Kvita et al. | 260/326 |
| 4,246,162 | 1/1981 | Schreiber | 260/37 |
| 4,335,228 | 6/1982 | Beitchman et al. | 525/528 |
| 4,417,010 | 11/1983 | Shimp | 523/466 |
| 4,420,605 | 12/1983 | Kaufman | 528/94 |
| 4,532,274 | 7/1985 | Spurr | 528/94 X |
| 4,533,715 | 8/1985 | Lee et al. | 528/45 |

FOREIGN PATENT DOCUMENTS

0118270 9/1984 European Pat. Off.

*Primary Examiner*—Earl Nielsen
*Attorney, Agent, or Firm*—D. M. Sell; C. Truesdale

[57] ABSTRACT

Storage-stable, thermally-curable, one-part epoxy resin compositions comprising a curable opoxide resin; a curative amount of an aliphatic or non-aromatic cyclic polyol having about 2 to 18 carbon atoms, at least two hydroxy groups of said polyol being primary or secondary, and said polyol being free of strong acid groups, and free of electron-withdrawing substituents and large groups which cause steric hindrance in the α-position in relation to the carbon atoms attached to the methylol groups of the polyol; and a catalytic amount of an imidazole compound.

20 Claims, No Drawings

EPOXY RESIN COMPOSITION

This is a continuation of application Ser. No. 860,511, filed May 7, 1986, now abandoned.

BACKGROUND OF THE INVENTION

This invention relates to latently curable one-part epoxy resin compositions.

Epoxy resins, i.e., organic compounds having one or more terminal or pendant oxirane groups,

have been widely used for many years in adhesive compositions. Various curatives, accelerators, and additives have been used with the epoxy resins to modify the curing properties and adhesive characteristics.

U.S. Pat. No. 3,553,166 (Anderson et al.) and U.S. Pat. No. 3,677,978 (Dowbenko et al.) disclose storage stable, elevated temperature curable epoxy resin compositions which contain epoxy resin and, as a curing agent, a metal salt complex of an imidazole. Anderson further discloses the addition of nitrogenous compounds to improve structural strength.

Other various curing systems disclosed for use with epoxy resins include dialky/amino-alkylimidazoles in U.S. Pat. No. 3,912,689 (Bechara et al.) fluoroalkylsulfonate salts of a metal coordinated with imidazole or substituted imidazole ligands in U.S. Pat. No. 4,101,514 (Thom), phthalic acid derivatives which are substituted by alkenylamino groups in U.S. Pat. No. 4,140,703, imidyl- and isoimidyl-phthalic anhydrides in U.S. Pat. No. 4,160,081 (Kvita et al.), imidyl-benzene-dicarboxylic and -tricarboxylic acid derivatives in U.S. Pat. No. 4,233,220 (Kvita et al.), imidazole accelerators with aromatic polyol hardeners in U.S. Pat. No. 4,246,162 (Schreiber), isocyanate blocked imidazles and imidazolines in U.S. Pat. No. 4,355,228 (Beitchman et al.), naphthyl diisocyanate blocked imidazole in U.S. Pat. No. 4,533,715 (Lee et al.), solutions or eutectic mixtures of imidazoles with N,N'-dihydroxyethyl-5-,5-dimethyl hydantoin or trimethylpentanediol in U.S. Pat. No. 4,417,010 (Shimp) and a liquid blend of an imidazole and a mixture of trimethylolpropane and 1,4-butanediol in European Patent Application 0 118,270 (Celanese).

SUMMARY OF THE INVENTION

The present invention provides storage-stable, thermally-curable, one-part epoxy resin compositions comprising a curable epoxide resin; a curative amount of aliphatic or non-aromatic cyclic polyol having about 2 to 18 carbon atoms, at least two hydroxyl groups of said polyol being free of strong acid groups and primary or secondary, and said polyol being free of electron-withdrawing substituents, and large substituents which would cause steric hindrance, in the α-position in relation to the carbon attached to the methylol group of the polyol and preferably being insoluble in the epoxide resin; and a catalytic amount of an imidazole compound selected from (a) compounds represented by the formula $$M^1(L^1)_a(X^1)_b$$

where $M^1$ is $Ni^{++}$, $Cu^{++}$, or $Co^{++}$, $L^1$ is

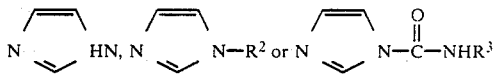

where $R^2$ is alkyl having 1 to 18 carbon atoms, cyanoalkyl having 1 to 4 carbon atoms, phenyl, or substituted phenyl, and $R^3$ is alkyl having 1 to 18 carbon atoms, phenyl, or substituted phenyl, $X^1$ is $-R^4(COO^-)_2$ where $R^4$ is phenyl, naphthyl, or $C_mH_{2m-1}$ where m is 0, 1, or 2, or $X^1$ is $-R^5(COO^-)_e$ where $R^5$ is phenyl or naphthyl and e is 3, 4, or 5, or $X^1$ is an anion of a strong inorganic acid, i.e., an acid having a $pK_a$ of less than 2, a is 2, 4 or 6, and b is 0.5, 0.67, 1, or 2 depending on the valence of $X^1$;

(b) compounds represented by the formula $L^2X^2$ where $L^2$ is

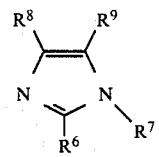

where $R^6$ is $-H$, $-C_nH_{2n+1}$ or

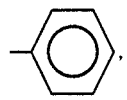

n being a number of from 1 to 16, $R^7$ is $-H$, $-CH_3$, $-C_2H_5$, $-C_2H_4CN$, or

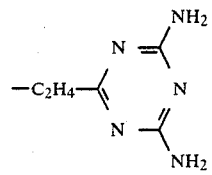

$R^8$ is $-H$, $-CH_3$, $-C_2H_5$, $-CH_2OH$, or

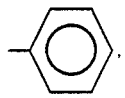

$R^9$ is $-H$ or $-CH_2OH$ $X^2$ is $-R^4(COOH)_2$ where $R^4$ is phenyl, naphthyl, or $C_mH_{2m-1}$ where m is 0, 1, or 2, or $X^2$ is $-R^5(COOH)_e$ where $R^5$ is phenyl or naphthyl and e is 3, 4, or 5, or $X^2$ is isocyanuric acid, and (c) compounds represented by the formula $$M^3(L^3)_c$$

where $M^3$ is $Ni^{++}$, $Cu^{++}$, $Co^{++}$, $Zn^{++}$, $Cu^+$, or $Ag^+$, $L^3$ is

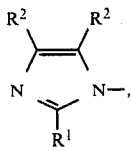

where $R^1$ is —H,

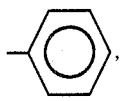

or $C_nH_{2n+1}$,
n being a number of from 1 to 16, and
each $R^2$ is —CH$_3$,

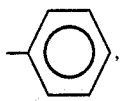

or —CH$_2$OH,
e is 1 or 2;
(d) compounds represented by the formula $L^4$ where $L^4$ is

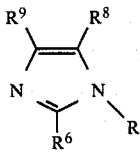

where $R^6$, $R^7$, $R^8$ and $R^9$ are the same as for compound (b); and
(e) a compound represented by the formula

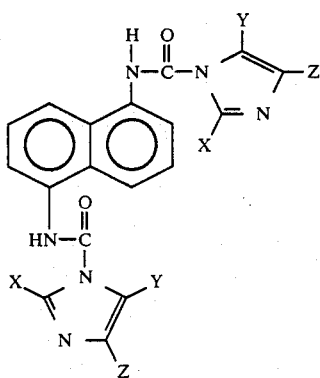

wherein X, Y, and Z may be the same or different, and each may be hydrogen, a lower alkyl or aryl having 1–12 carbon atoms, halo or nitro.

The composition also preferably contains a toughening agent. A flow control agent may also be present.

The composition is thermally curable by application of heat, e.g., in the range of 100° to 200° C.

The cured composition is useful as an adhesive, and in coatings, and molded, cast, and potted products. As an adhesive, the composition provides excellent shear and impact strength.

DETAILED DESCRIPTION OF THE INVENTION

Epoxide group-containing materials useful in the compositions of the invention are glycidyl ether derivatives having an oxirane ring polymerizable by ring opening. Such materials, broadly called glycidyl ether epoxides, include monomeric epoxy compounds and epoxides of the polymeric type.

These epoxide group-containing materials can vary from low molecular weight monomeric materials to high molecular weight polymers and can vary in the nature of their backbone and substituent groups. Illustrative permissible substituent groups include halogens, ethers, and siloxane groups. The molecular weight of the epoxy-containing materials can vary from 50 to about 100,000 or more. Mixtures of various epoxy-containing materials can also be used in the composition of this invention.

Such epoxide group-containing materials are well-known and include such epoxides as glycidyl ether type epoxy resins and the diglycidyl ethers of bisphenol A and of novolak resins, such as described in "Handbook of Epoxy Resins" by Lee and Neville, McGraw-Hill Book Co., New York (1967).

These epoxide group-containing materials which are useful in the practice of this invention include glycidyl ether monomers of the formula

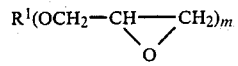

where $R^1$ is alkyl or aryl and m is an integer of 1 to 6. Examples are the glycidyl ethers of polyhydric phenols obtained by reacting a polyhydric phenol with an excess of chlorohydrin such as epichlorohydrin (e.g., the diglycidyl ether of bisphenol A, i.e., 2,2-bis(4,4'-epoxy propoxyphenyl)propane).

There are a host of commercially available epoxide group-containing materials which can be used in this invention. In particular, epoxides which are readily available include glycidol, diglycidyl ethers of bisphenol A (e.g., those available under the trade designations Epon ™ 828 available from Shell Chemical Co., and DER ™-331, DER ™-332, and DER ™-334 available from Dow Chemical Co.), diglycidyl ethers of bisphenol F (e.g., Epiclon ™ 830 available from Dainippon Ink & Chemicals, Inc.) silicone resins containing diglycidyl epoxy functionality, flame retardant epoxy resins (e.g., DER ™-580, a brominated bisphenol type epoxy resin available from Dow Chemical Co.), 1,4-butanediol diglycidyl ethers (e.g., Aradldite ™ RD-2 available from Ciba-Geigy), polyglycidyl ethers of phenol formaldehyde novolak (e.g., DEN ™-431 and DEN ™-438 available from Dow chemical Co.), and resorcinol diglycidyl ethers (e.g., Kopoxite ™ available from Koppers Company, Inc.). Preferably the epoxide group-containing material is the diglycidyl ether of bisphenol A or bisphenol F. Most preferably the epoxide group-containing material is the diglycidyl ether of bisphenol A.

The polyols useful in the present invention are aliphatic or non-aromatic cyclic polyols having 2 to 18 carbon atoms, at least two hydroxyl groups, preferably at least three hydroxyl groups, with at least one hydroxyl group, preferably at least two hydroxyl groups being primary. The polyol should be free of strong acids, and free of electron-withdrawing substituents such as —COOH, —CONH$_2$, >CO, —CH$_2$X where X is halogen, and large groups which cause steric hindrance, in the α-position in relation to the carbon atom attached to the methylol group of the polyol. Such groups, except strong acid groups, can be present in positions other than α to the carbon attached to the methylol group of the polyol. The term "polyol" also includes derivatives of the above-described polyols such as the reaction product of the polyol with di- or poly-isocyanate, or di- or poly-carboxylic acid, the molar ratio of polyol to —NCO, or —COOH being 1 to 1. The polyol is preferably insoluble in the epoxide resin to increase storage stability.

The polyol is present in the composition in a curative amount, i.e., an amount which is sufficient to react with the epoxide and cause the composition to cure more rapidly when heated. The addition of the curative amount of the polyol provides the composition with a reactivity, i.e., the length of time for exotherm to peak when held, at 137° C., of less than about 10 minutes, more preferably less than about 5 minutes, most preferably less than about 2 minutes. Preferably, the polyol is present in an amount to provide a hydroxyl to epoxide, i.e.,

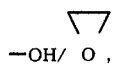
—OH/ O , ratio of about 0.5:1 to 1:1, more preferably about 0.7:1 to 0.8:1.

Examples of preferred polyols include trimethylyol ethane, trimethylol propane, trimethyol aminomethane, ethylene glycol, 2-butene-1,4-diol, pentaerythritol, dipentaerythritol, and tripentaerythritol. Other useful polyols include 1,3-butane diol, 1,4-butane diol, 2-diethyl-1,3-pentane diol, and 2,2-oxydiethanol.

The imidazole compounds useful in the present invention are compounds selected from (a) compounds represented by the formula M$^1$(L$^1$)$_a$(X$^1$)$_b$ where M$^1$ i Ni$^{++}$, Cu$^{++}$, or Co$^{++}$,
L$^1$ is

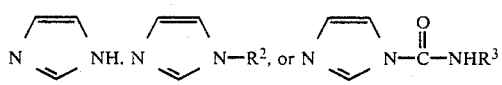

where R$^2$ is alkyl having 1 to 18 carbon atoms, cyanoalkyl having 1 to 4 carbon atoms, phenyl or substituted phenyl, e.g., ethylphenyl, diphenyl or tolyl,
R$^3$ is alkylene having 1 to 18 carbon atoms, phenyl, or substituted phenyl,
X$^1$ is —R$^4$(COO$^-$)$_2$ where R$^4$ is phenyl, naphthyl, or C$_m$H$_{2m-1}$
where m is 0, 1, or 2, or
X$^1$ is —R$^5$(COO$^-$)$_e$
where R$^5$ is phenyl or naphthyl and e is 3, 4, or 5, or
X$^1$ is an anion of a strong inorganic acid, i.e., an acid having a pK$_a$ of less than 2,
a is 2, 4 or 6, and
b is 0.5, 0.67, 1, or 2 depending on the valence of X$^1$;
(b) compounds represented by the formula

L$^2$X$^2$ where L$^2$ is

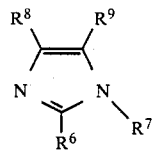

where R$^6$ is —H, C$_n$H$_{2n+1}$ or

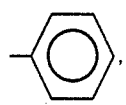

n being a number of from 1 to 16,
R$^7$ is —H, —CH$_3$, —C$_2$H$_5$, —C$_2$H$_4$CN,

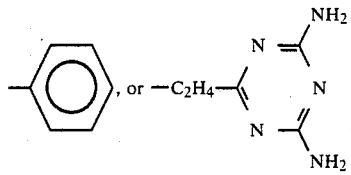

R$^8$ is —H, —CH$_3$, —C$_2$H$_5$, —CH$_2$OH, or

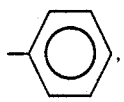

R$^9$ is —H or —CH$_2$OH
X$^2$ is —R$^4$(COOH)$_2$ where R$^4$ is phenyl, naphthyl, or C$_m$H$_{2m-1}$
where m is 0, 1, or 2, or
X$^2$ is —R$^5$(COOH)e
where R$^5$ is phenyl, or naphthyl
and e is 3, 4, or 5, or
X$^2$ is isocyanuric acid, and
(c) compounds represented by the formula M$^3$(L$^3$)$_c$ where M$^3$ is Ni$^{++}$, Cu$^{++}$, Co$^{++}$, Zn$^{++}$, Cu$^+$, or Ag$^+$,
L$^3$ is

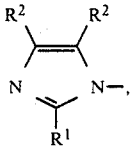

where R$^1$ is —H,

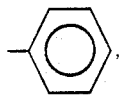

or $C_nH_{2n+1}$,
n being a number of from 1 to 16, and
each $R^2$ is —$CH_3$,

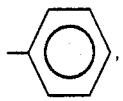

or —$CH_2OH$,
e is 1 or 2; and
(d) compounds represented by the formula $$L^4$$

where L is

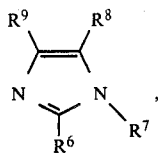

where $R^6$, $R^7$, $R^8$ and $R^9$ are the same as for compound (b); and
(e) a compound represented by the formula

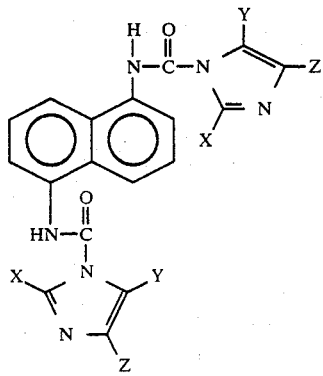

wherein X, Y and Z may be the same or different, and each may be hydrogen, a lower alkyl or aryl having 1–12 carbon atoms, halo or nitro.

The imidazoles or imidazole containing compounds, hereinafter termed "imidazoles" are present in the composition in catalytic amounts, i.e., amounts sufficient to catalyze the reaction between the epoxide resin and the polyol on heating of the composition. Preferably, the amount of the imidazole used is about 1 to 10 weight percent, more preferably about 3 to 7 weight percent based on the weight of the epoxide and polyol present. Preferably the imidazole is insoluble in the epoxide resin to provide increased storage stability.

Examples of suitable imidazoles include hexakis(imidazole)nickel phthalate, hexakis(imidazole)nickel benzene tetracarboxylate, bis(imidazole)nickel oxalate, tetrakis(imidazole)nickel malonate, hexakis(imidazole)nickel hexafluorotitanate, hexakis(imidazole)cobaltous hexafluorotitanate, tetrakis(imidazole)cupric hexafluorotitanate, hexakis(imidazole)nickel phosphate, hexakis(imidazole)nickel monohydrogen phosphate, hexakis(imidazole)nickel dihydrogen phosphate, 2-phenyl-4-methyl-5-hydroxymethyl imidazole, 2-phenyl-4,5-dihydroxymethyl imidazole, 1-cyanoethyl-2-phenyl-4,5-di(cyanoethylmethyl)imidazole, 1-cyanoethyl-2-undecylimidazole trimellitate, 1-cyanoethyl-2-phenyl imidazole trimellitate, 2,4-diamino-6-[2'-methylimidazolyl-(1')]ethyl-s-triazine, imidazole/oxalic acid adduct, 1-cyanoethylimidazole/malonic acid adduct, 2-phenylimidazole/isocyanuric acid adduct, silver imidazolate silver-2-ethyl-4-methyl imidazolate copper-(I)-2-phenylimidazolate, and nickel imidazolate. Particularly preferred imidazoles include hexakis(imidazole)nickel phthalate, hexakis(imidazole)nickel persulfate, 1-cyanoethyl-2-undecylimidazole trimellitate, and 1-cyanoethyl-2-phenylimidazole trimellitate.

The metal imidazole salts, i.e., phthalates, carboxylates, oxalates, malonates, titanates, etc., can be prepared by adding a solution of 0.2 equivalents of the sodium or potassium salt of the corresponding acid in 100 ml water to a solution of 0.1 mol $(Ni(OAc)_2 \cdot 4H_2O$ and 0.6 mol imidazole in 250 ml water at 50° C. After cooling to 5° C., the desired metal imidazole salt precipitates, is filtered, washed, and dried.

The composition preferably contains a toughening agent to aid in providing the desired overlap shear and impact strength. Suitable toughening agents include polymeric compounds having both a rubbery phase and a thermoplastic phase or being capable of forming, with the epoxide group-containing material both a rubbery phase and a thermoplastic phase on curing and which inhibit cracking of the cured epoxy composition.

A preferred class of polymeric toughening agents which are capable of forming, with the epoxide group-containing material, both a rubbery phase and a thermoplastic phase on curing are carboxyl-terminated butadiene acrylonitrile compounds having the general formula

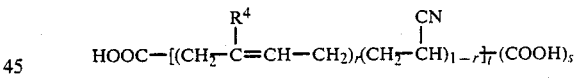

where $R^4$ is hydrogen or a methyl group, r is about 0.90 to 0.6, s is about 1 to 3, and t is about 16 to 50. The carboxyl-terminated butadiene acrylonitrile compounds are preferably prereacted with a diglycidyl ether of bisphenol A at, for example, a ratio of 30 to 70 parts by weight of the carboxyl-terminated butadiene acrylonitrile compound to 70 to 30 parts by weight of the diglycidyl ether of bisphenol A to increase the pot-life of the composition and provide increased shear strength at high humidity. Commercially available carboxyl-terminated butadiene acrylonitrile compounds include Hycar 1300×8, Hycar 1300×13, and Hycar 1300×17 available from B. F. Goodrich.

Other preferred polymeric toughening agents are graft polymers which have both a rubbery phase and a thermoplastic phase, such as those disclosed in U.S. Pat. No. 3,496,250 which is incorporated herein by reference. These graft polymers have a rubbery backbone with a thermoplastic polymer grafted thereto. Examples of such graft polymers include methacrylate/butadiene-styrene, acrylate-methacrylate/butadiene-styrene and acrylonitrile/butadiene-styrene polymers.

The rubbery backbone preferably can be prepared so as to constitute from about 95 percent to about 40 percent by weight of the total graft polymer, and the thermoplastic monomer or group of monomers which are polymerized in the presence of the rubbery backbone constitute from about 5 percent to about 60 percent by weight of the graft polymer.

Further preferred polymeric toughening agents which have both a rubbery phase and a thermoplastic phase are acrylic core-shell polymers wherein the core is an acrylic polymer having a glass transition temperature below about 0° C., such as polybutyl acrylate or polyisooctyl acrylate, and the shell is an acrylic polymer having a glass transition temperature above about 25° C., such as polymethylmethacrylate. Commercially available core-shell polymers include Acryloid TM KM 323, Acryloid TM KM 330, and Paraloid TM BTA 731, all available from Rohm and Haas Co.

For the greatest toughening effect, both the carboxyl-terminated butadiene acrylonitrile and the core-shell polymers are used in combination in the composition.

The toughening agents are preferably present in the composition in an amount of about 8 to 34 weight percent, more preferably 14 to 28 weight percent, most preferably 18 to 24 weight percent based on the weight of the epoxide resin and polyol in the composition. When a combination of carboxyl-terminated butadiene acrylonitrile and core-shell polymers are used, the weight ratio is preferably 3:1 to 1:3, more preferably 2:1 to 1:2, most preferably 1:1, respectfully.

The composition preferably contains a flow control agent or thickener, to provide the desired rheological characteristics to the composition. Suitable flow control agents include fumed silicas, such as treated fumed silica, Cab-O-Sil TM TS 720, and untreated fumed silica Cab-O-Sil TM M5, available from Cabot Corp., and short fibers, such as cotton and Kevlar TM pulp, a high-temperature polyamide fiber available from DuPont Co., with treated fumed silica being preferred. When the composition is to be used as a structural adhesive, the flow control agent is preferably present in an amount, e.g. generally about 2 to 5 weight percent, to provide an observable sag of less than 2 mm, more preferably 0 mm.

The composition may contain a reactive diluent to aid in controlling the press-flow characteristics of the composition. Suitable diluents are compounds having at least one glycidyl ether terminal portion and, preferably, a saturated or unsaturated cyclic backbone. Examples of such diluents include: diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N',N',-tetraglycidyl meta-xylylene diamine, and vegetable oil polyglycidyl ether. The minimum amount of reactive diluent needed to provide acceptable press-flow values should be used in the composition as the addition of reactive diluent may reduce the lap shear strength and impact strength. When the composition is to be used as an adhesive, the reactive diluent preferably provides a press-flow value of less than 100 sec., more preferably less than about 50 sec. when tested according to GM Test 9021, Method M using a pressure of 551.6 kPa.

The epoxy resin composition can also contain conventional additives such as fillers, e.g., aluminum powder, carbon black, glass bubbles, talc, clay, calcium carbonate, barium sulfate, titanium dioxide, silicas, silicates, and mica, with aluminum powder being preferred.

The compositions of the invention preferably have a pot life, i.e., length of time in which viscosity doubles, of at least 3 days, more preferably at least 30 days, most preferably more than 60 days at 22° C. and at least 12 hours, more preferably about 3 days, most preferably at least 14 days at 35° C. Both the selection of the polyol and the imidazole affect the pot life of the composition. Generally, pot life increases when the polyol and imidazole are insoluble in the liquid portion of the composition at temperatures of about 25° to 35° C.

The reactivity of the composition is preferably such that the length of time for the exotherm to peak when tested using a differential scanning calorimeter held at a temperature of 137° C. is less than 10 minutes, more preferably, less than 5 minutes, most preferably less than 2 minutes.

The epoxy resin compositions, when used as adhesives with electrocoated galvanized steel, are capable of providing initial room temperature (22° C.) impact strength of at least 11400 $J/m^2$, and impact strengths at $-30°$ C. of at least 2200 $J/m^2$ preferably at least 4400 $J/m^2$, more preferably at least 11,400 $J/m^2$ and an overlap shear strength of at least 7 MPa, preferably at least 10.5 MPa, more preferably at least 13.5 MPa, when cured at a temperature of 165° C. for 30 minutes. The compositions, in the preferred embodiments, are capable of retaining impact strength of at least 2200 $J/m^2$, more preferably 4400 $J/m^2$, most preferably 11,400 $J/m^2$ after immersion in boiling water for 24 hours, and are capable of retaining overlap shear strength of at least 5 MPa, preferably at least 7 MPa, most preferably at least 10 MPa, after 24 hours submersion in boiling water and after 10 minutes at 80° C.

To determine lap shear strength and impact strength, samples are prepared using electrocoated galvanized steel coupons (0.8 mm thick, 25.4 mm wide, 76.2 mm long) or etched aluminum test pieces (1.6 mm thick, 25.4 mm wide, 76.2 mm long). Each steel coupon is wiped with oil (type KA-45M, available from H. A. Montgomery Co.) using a saturated cheese cloth. After 10 minutes, excess oil is removed by wiping twice with a clean cheese cloth. Aluminum coupons are prepared by using an FPL (Forest Products Laboratories) etch (immersion in a sulfuric acid/chromic acid bath) followed by a water rinse and drying. Adhesive is applied over an end portion of one coupon. Two 2.5 cm lengths of 0.25 mm piano wire are placed across the adhesive about 8 mm apart. An end portion (1.25 cm) of a second test panel is placed over the adhesive to form a 1.25 cm overlap. The test panels are clamped at each edge of the overlap using 0.94 cm capacity binder clips No. 10020 available from IDL Mfg. and Sales Corp., Carlstadt, NJ, until the adhesive is cured either in a forced air oven at 165° C. for 30 minutes or where the coupons are steel, by electromagnetic inductive heating using a Lepel Type T-2.5-1-KC-B-W Model T-254-62 generator, available from Lepel Corp., with a 4-turn box coil (6.25 cm sq.×3.125 cm deep) of 0.47 cm diameter copper tubing for a period of from 2.5 to 3.5 seconds. During inductive heating, induced current dissipated by the metal as heat heats the surface of the specimen in contact with the adhesive, thereby initiating rapid cure.

Lap shear strength is determined using ASTM Test Method D 1002-2 initially (after cooling), after immersion in boiling water for 24 hours followed by air drying for 12 hours and at 80° C. by equilibrating the coupons for 10 minutes at 80° C. in a constant temperature chamber and testing the coupons while in the constant temperature chamber. Impact strength is determined on adhered coupons stored at −30° C. for at least two hours and tested immediately after removal from storage, or on adhered coupons at room temperature (about 22° C.) and after immersion in boiling water for 24 hours followed by air drying for 12 hours. The adhered coupons are supported horizontally about 8 mm from each end and subjected to impact by a 1680 g steel wedge, 6.35 cm in height and having a rounded (6.35 mm radius) nose hardened to Rockwell C-50 to C-60 suspended from a fulcrum by a 1.1 cm diameter, 47.6 cm long rod, the rod being permitted to swing down from the horizontal to the vertical through 90°, and the nose of the wedge impacting the sample as the vertical position is reached.

Sag resistance of the composition is measured on electrocoated steel panels which have been wiped with oil as for the shear and impact strength tests. A 0.48 cm diameter bead 10 cm long is applied with a caulking gun on a steel panel lying horizontally. The panel is then placed in a vertical position with the bead horizontal. The amount of sag or slump exhibited by the bead is measured after 4 hours. The bead preferably sags less than 2 mm. More preferably, the bead exhibits no sag.

The pot life of the adhesive composition is the length of time during which the viscosity of the composition doubles at a given temperature. The reactivity of the composition is the time to cure (exotherm peak) when a 10 mg sample is held at 137° C. in a differential scanning calorimeter.

In the following non-limiting examples, all parts are by weight unless otherwise specified.

EXAMPLES 1 AND 2

Adhesive compositions were prepared using the following formulations:

|  | Ex. 1 (Parts) | Ex. 2 (Parts) |
| --- | --- | --- |
| DER TM 332 | 38.0 | 44.7 |
| Paraloid TM BTA-731 | 5.6 | 6.6 |
| Hexakis (imidazole) nickel phthalate | 2.9 | 3.4 |
| Trimethylolethane | 9.1 | 10.7 |
| Hycar TM 1300 × 8/DER TM 332[1] | 15.9 | 18.6 |
| Cab-O-Sil TM TS 720 | 3.5 | 3.5 |
| Aluminum powder | — | 12.5 |
| Calcium carbonate CS-11 | 25.0 | — |

[1] An adduct prepared by blending 60 parts by weight DER TM 322 with 40 parts by weight Hycar TM 1300 × 8, heating the mixture to 80–85° C., adding 0.1 part triphenylphosphine, and reacting the mixture at 80–85° C. for 2 hours with stirring.

In preparing the compositions of Examples 1 and 2, the epoxide (DER TM 332) is preheated to 120° C., the Paraloid TM BTA 731 is added, and the mixture is agitated under high shear for 1 hour at 120° C. A preblend of the Hycar 1300×8 adduct, the trimethylolethane and the hexakis (imidazole) nickel phthalate is passed through a paint mill three times to achieve a uniform mix. These preblends are combined and the Cab-O-Sil TM TS720, aluminum powder, and calcium carbonate are added with mixing until a uniform composition is attained.

Samples were prepared as described above using electrocoated galvanized steel and cured by inductive heating for the time set forth in Table 1. Tests were run for initial lap shear strength at 22° C., the results being reported in Table 1.

TABLE 1

| Cure time (sec) | Lap shear strength (MPa) | |
| --- | --- | --- |
|  | Ex. 1 | Ex. 2 |
| 2.7 | 5.3 | 5.5 |
| 2.8 | 10.9 | 8.3 |
| 2.9 | 10.6 | 9.7 |
| 3.0 | 10.1 | 11.0 |
| 3.1 | 9.7 | 11.7 |
| 3.2 | 6.7 | 11.7 |

EXAMPLES 3 AND 4

In Examples 3 and 4, samples were prepared as in Examples 1 and 2, respectively, except that the adhesive composition was cured in a forced air oven for 30 minutes at 165° C. The samples were tested for initial lap shear strength at room temperature, and after 24 hour immersion in boiling water and for initial lap shear strength at room temperature and after 24 hour immersion in boiling water. Each composition was tested for press-flow value. The results are shown in Table 2.

TABLE 2

| Ex. | Press-flow value (sec) | Lap shear strength (MPa) | | Impact strength $(J/m^2 \times 10^2)$ at 22° C. | |
| --- | --- | --- | --- | --- | --- |
|  |  | Initial | 24 hour boil | Initial | 24 hour boil |
| 3 | 85 | 14.9 | 9.8 | ≧114 | 55 |
| 4 | 50 | 15.0 | 10.8 | ≧114 | ≧114 |

EXAMPLES 5–9

In Examples 5–9, adhesive compositions were prepared as in Examples 1 and 2 using the following formulations:

|  | Ex. 5 (parts) | Ex. 6 (parts) | Ex. 7 (parts) | Ex. 8 (parts) | Ex. 9 (parts) |
| --- | --- | --- | --- | --- | --- |
| Epon TM 828 | — | 48.8 | 45.8 | 37.2 | 36.2 |
| DER TM 332 | 36.1 | — | — | — | — |
| Paraloid TM BTA-731 | 8.5 | 11.6 | 10.9 | — | 18.7 |
| Hexakis(imidazole) nickel phthalate | 2.7 | 3.6 | 3.4 | 2.8 | 2.7 |
| Trimethylolethane | 8.6 | 11.6 | 10.9 | 8.9 | 8.7 |
| Hycar TM 1300 × 8/DER TM 332 | 15.1 | 20.4 | — | 22.2 | 15.1 |
| Cab-O-Sil TM TS-720 | 4.0 | — | 4.0 | 4.0 | 3.5 |
| Aluminum powder | 25.0 | — | 25.0 | 25.0 | 25.0 |

Samples were prepared and tested as described above in Examples 3 and 4. The results are shown in Table 3.

TABLE 3

| Ex. | Press-flow value (sec) | Lap shear strength (MPa) | | Impact strength $(J/m^2 \times 10^2)$ at 22° C. | |
| --- | --- | --- | --- | --- | --- |
|  |  | Initial | 24 hour boil | Initial | 24 hour boil |
| 5 | 190 | 13.7 | 12.3 | ≧114 | 102 |
| 6 | 103 | 14.6 | 10.5 | 98 | 100 |
| 7 | 551 | 13.8 | 12.9 | ≧114 | 98 |
| 8 | 70 | 13.6 | 7.9 | ≧114 | 75 |
| 9 | 163 | 14.5 | 12.7 | ≧114 | 114 |

EXAMPLES 10-34 AND COMPARATIVE EXAMPLE 1

In Examples 10-34, compositions were prepared, using the following formulation with various polyol curing agents in the amounts shown in Table 4.

| | Parts by Weight |
|---|---|
| DER TM 332 | 67.2 |
| Paraloid TM BTA 731 | 16.0 |
| DER TM 332/Hycar TM 1300 × 8 adduct | 28.0 |
| Hexakis(imidazole)nickel phthalate | 5.0 |
| Cab-O-Sil TM TS 720 | 5.2 |
| Aluminum powder | 32.6 |
| Polyol | — |

The Paraloid TM BTA 731 (toughening agent) is predispersed in the epoxide (DER TM 332) in a high shear mixer at 150° C. and mixed for one to two hours. To this dispersion are added the prepared adduct and the trimethylol propane. This mixture is mixed for 5 minutes and then cooled. The imidazole catalyst is then added, followed by addition of the Cab-O-Sil TM TS-720 and the aluminum powder. Mixing is continued using a paint mill until all materials are well-dispersed.

In Comparative Example 1, an epoxy resin composition was prepared as in Examples 10-34, except that no polyol was added.

The compositions were tested for pot life and reactivity. Samples were prepared using electrocoated galvanized steel coupons as described hereinabove, with oven curing at 165° C. for 30 minutes. Samples tested for lap shear strength at 80° C. were post-cured at 200° C. for 30 minutes. The results are shown in Table 4.

TABLE 4

| Ex. | Polyol | Amount (parts) | Pot Life (days) 22° C. | Pot Life (days) 35° C. | Reactivity (minutes) | Lap shear strength (MPa) Initial | Lap shear strength (MPa) 24 hr. boil | Lap shear strength (MPa) 80° C. | Impact strength at −30° C. (J/m$^2$ × 10$^2$) |
|---|---|---|---|---|---|---|---|---|---|
| 10 | Trimethylol ethane | 14.0 | 120 | 18 | 1.6 | 14.8 | 9.4 | | ≧114 |
| 11 | Trimethylol propane | 15.6 | 24 | 5 | 1.9 | 14.7 | 11.9 | 9.2 | ≧114 |
| 12 | Trimethylol amino methane | 10.6 | >60 | 40 | 1.7 | 12.5 | 9.4 | 11.0 | ≧114 |
| 13 | Ethylene glycol | 10.9 | 8 | 2 | 1.4 | 12.1 | 1.0 | 2.2 | ≧114 |
| 14 | 2-butyne-1,4-diol | 15.5 | 5 | 1 | 0.7 | 13.7 | 11.4 | 3.5 | 105 |
| 15 | Pentaerythritol | 11.9 | >60 | 21 | 4.1 | 14.1 | 9.5 | 11.6 | ≧114 |
| 16 | Dipentaerythritol ether | 14.9 | >60 | 12 | 6.7 | 12.5 | 6.1 | 10.6 | ≧114 |
| 17 | Tripentaerythritol | 10.4 | >60 | 12 | 9 | 11.4 | 5.3 | 10.3 | 105 |
| 18 | 1,3-butane diol | 15.7 | 16 | 5 | 2.1 | 12.5 | 1.4 | 1.8 | 25 |
| 19 | 1,4-butane diol | 15.7 | 15 | 2 | 1.2 | 13.3 | 0.7 | 1.4 | 31 |
| 20 | 2-diethyl-1,3 pentane diol | 23.1 | >60 | 7 | 2.5 | 11.1 | 4.8 | 2.9 | 32 |
| 21 | 2,2′-oxydiethanol | 18.6 | 7 | 2 | 1.2 | 11.0 | 0.7 | 1.2 | 36 |
| 22 | Glycerol | 10.7 | >20 | 5 | 1.7 | 9.7 | 2.8 | 1.4 | 31 |
| 23 | 1,2,4-butane triol | 12.5 | >20 | 3 | 1.6 | 13.7 | 8.3 | 8.3 | ≧114 |
| 24 | 1,2,6-hexane triol | 17.8 | >20 | 5 | 1.4 | 13.8 | 9.5 | 4.1 | 53 |
| 25 | Triethanolamine | 17.0 | 1 | 1 | 1.0 | 14.7 | 6.0 | 1.7 | ≧114 |
| 26 | 1,6-Hexane diol | 20.7 | 20 | 3 | 2.7 | 13.5 | 4.8 | 1.9 | 31 |
| 27 | 2,3-Butane diol | 15.7 | 7 | 2 | 2.6 | 12.2 | 3.5 | 3.0 | 34 |
| 28 | 2-Butene-1,4-diol | 15.6 | 5 | 1 | 0.9 | 12.7 | 2.8 | 1.4 | 31 |
| 29 | 2,2′-Bis(hydroxy-methyl)-2,2′,2″-nitrilotriethanol | 14.6 | >60 | >30 | 1.7 | 13.0 | 10.2 | 11.9 | 105 |
| 30 | Tricine | 20.9 | 50 | 13 | 6.4 | 10.5 | 0 | 5.2 | 38 |
| 31 | 1,5-Pentane diol | 18.2 | 10 | 3 | 1.5 | 13.1 | 1.0 | 1.9 | 32 |
| 32 | Dantocol TM DHE (available from Glyco, Inc.) | 37.8 | 18 | 3 | 2.4 | 14.6 | 0.7 | 1.7 | 26 |
| 33 | 2,5-Dimethyl-2,5-hexanediol | 50.0 | >30 | >20 | 2.4 | 7.2 | 0 | 1.7 | 28 |
| 34 | 1,4-Cyclohexane-dimethanol | 25.2 | >30 | 16 | 3.9 | 11.0 | 6.2 | 2.3 | 76 |
| Comp 1 | none | — | >60 | >60 | >>10 | 0.5 | 7.5 | 9.6 | ≧114 |

EXAMPLES 35-54

In Examples 35-54, compositions were prepared, as described in Examples 10-34, using the following formulation with various imidazole catalysts as set forth in Table 5.

| | Parts by weight |
|---|---|
| DER TM 332 | 67.2 |
| Paraloid TM BTA 731 | 16.0 |
| DER TM 332/Hycar TM 1300 × 8 | 28.0 |
| Trimethylol propane | 15.6 |
| Cab-O-Sil TM TS 720 | 5.2 |
| Aluminum powder | 32.6 |
| Imidazole (various) | 5.0 |

Electrocoated galvanized steel coupons were prepared and tested for lap shear strength and impact strength. Test results are shown in Table 5.

TABLE 5

| Ex. | Imidazole | Pot Life (days) 22° C. | Pot Life (days) 35° C. | Reactivity (minutes) | Lap shear strength (MPa) Initial | Lap shear strength (MPa) 24 hr. boil | Lap shear strength (MPa) 80° C. | Impact Strength at −30° C. (J/m$^2$ × 10$^2$) |
|---|---|---|---|---|---|---|---|---|
| 35 | 1-Cyanoethyl-2-imdecyl- | 15 | 4 | 3.2 | 16.9 | 11.8 | 11.8 | ≧114 |

TABLE 5-continued

| Ex. | Imidazole | Pot Life (days) 22° C. | Pot Life (days) 35° C. | Reactivity (minutes) | Lap shear strength (MPa) Initial | Lap shear strength (MPa) 24 hr. boil | Lap shear strength (MPa) 80° C. | Impact Strength at −30° C. (J/m² × 10²) |
|---|---|---|---|---|---|---|---|---|
|  | imidazole trimellitic acid adduct |  |  |  |  |  |  |  |
| 36 | 1-Cyanoethyl-2-phenyl imidazole trimellitic acid adduct | >60 | 13 | 3.1 | 14.8 | 9.0 | 12.1 | ≧114 |
| 37 | 2-Phenyl-4,5-dihydroxymethyl imidazole | >60 | 30 | 4.0 | 15.3 | 9.9 | 12.4 | 84 |
| 38 | 2,4-Diamino-6-[2'-methyl-imidazolyl-(1')]ethyl-s- | 30 | 5 | 0.8 | 15.1 | 10.5 | 3.4 | 74 |
| 39 | 1-Cyanoethyl-2-phenyl-4,5-di(cyanoethylmethyl) imidazole | 2 | 1 | 0.6 | 15.2 | 13.3 | 4.5 | 51 |
| 40 | Imidazole | 3 | 1 | 0.6 | 12.6 | 12.9 | 1.4 | 32 |
| 41 | 2-Phenyl-4-methyl-5-hydroxymethyl imidazole | 25 | 4 | 1.4 | 14.0 | 13.6 | 8.3 | 32 |
| 42 | 2-Phenylimidazole/ isocyanuric acid adduct | 3 | 1 | 0.8 | 12.3 | 10.5 | 3.3 | 27 |
| 43 | Hexakis(imidazole)nickel phthalate | 24 | 6 | 1.7 | 14.8 | 10.7 | 11.5 | ≧114 |
| 44 | Bis(imidazole)nickel oxalate | >60 | 16 | 10.0 | 15.6 | 14.6 | 10.8 | 105 |
| 45 | Hexakis(imidazole)nickel persulfate | >50 | 12 | 2.7 | 13.1 | 8.3 | 8.6 | 105 |
| 46 | Hexakis(imidazole)nickel succinate | >50 | 4 | 1.3 | 13.8 | 9.9 | 7.3 | 42 |
| 47 | Hexakis(imidazole)nickel carbonate | 40 | 6 | 1.5 | 14.7 | 2.4 | 2.1 | 32 |
| 48 | Hexakis(imidazole)cobalt hexafluorotitanate | 60 | 13 | 2.8 | 13.5 | 1.4 | 3.7 | 38 |
| 49 | Silver-2-methylimidazolate | >60 | 30 | 2.1 | 15.1 | 5.2 | 12.1 | ≧114 |
| 50 | Nickel imidazolate | >40 | 7 | 1.8 | 16.0 | 2.1 | 10.0 | 105 |
| 51 | Copper-2-ethyl-4-methyl imidazolate | 15 | 10 | 3.6 | 15.2 | 7.2 | 6.1 | 81 |
| 52 | Copper (I) imidazolate | >60 | 24 | 9.0 | 12.1 | 7.9 | 4.8 | 32 |
| 53 | Copper (II) imidazolate | 30 | 5 | 1.9 | 15.2 | 9.0 | 5.3 | 31 |
| 54 | Silver imidazolate | >60 | 13 | 2.4 | 12.4 | 10.1 | 3.2 | 28 |

EXAMPLES 55–60

Adhesive formulations were prepared as in Example 3, except that the polyol and amount thereof and imidazole (5 parts in each formulation) set forth in Table 6 were substituted for the trimethylolethane and the hexakis(imidazole)nickel phthalate, respectively.

TABLE 6

| Ex. | Polyol | Parts polyol | Imidazole |
|---|---|---|---|
| 55 | Trimethylol propane | 15.6 | Hexakis(imidazole)nickel phthalate |
| 56 | Trimethylol propane | 15.6 | Hexakis(imidazole)nickel persulfate |
| 57 | Trimethylol propane | 15.6 | Imidazole |
| 58 | Trimethylol propane | 15.6 | 2-Phenyl-4,5-dihydroxymethyl imidazole |
| 59 | Pentaerythritol | 11.9 | Hexakis(imidazole)nickel phthalate |
| 60 | Trimethylol ethane | 14.0 | Hexakis(imidazole)nickel phthalate |

Etched aluminum panels were coated using the method described hereinabove. The panels were cured for 30 minutes at 150° C. and tested for initial lap shear strength, lap shear strength after immersion in boiling water for 24 hours and impact strength. The results are set forth in Table 7.

TABLE 7

| Example | Lap shear strength (MPa) Initial | Lap shear strength (MPa) 24 hour boil | Impact strength at 30° (J/m² × 10²) |
|---|---|---|---|
| 55 | 24.8 | 20.8 | ≧114 |
| 56 | 20.0 | 16.8 | ≧114 |
| 57 | 23.4 | 16.8 | 93 |
| 58 | 24.2 | 18.4 | 93 |
| 59 | 19.0 | 17.6 | 47 |
| 60 | 21.0 | 17.6 | 93 |

EXAMPLES 61–72

In Examples 61–72, compositions were prepared as described in Examples 5 except that reactive diluents, as set forth in Table 8, were added to the Paraloid TM BTA 731 and Epon TM 828 predispersion with the formulations being as follows:

|  | Parts by Weight |
|---|---|
| Epon TM 828 | 34.7 |
| Paraloid TM BTA 731 | 6.2 |
| Reactive diluent | 5.2 |
| Hycar TM 1300 × 8/DER TM 332 adduct | 14.5 |
| Trimethylolethane | 8.3 |
| Hexakis(imidazole)nickel phthalate | 2.6 |
| Cab-O-Sil TM TS 720 | 3.5 |
| Aluminum powder | 25.0 |

Each composition was tested for press-flow value, lap shear strength, and impact strength after curing at 165° C. for 30 minutes. The results are set forth in Table 8.

TABLE 8

| Ex. | Diluent | Press flow value (sec.) | Lap shear strength (MPa) Initial | Lap shear strength (MPa) 24 hour boil | Lap shear strength (MPa) 80° C. | Impact strength at 22° C. ($J/m^2 \times 10^2$) Initial | Impact strength at 22° C. ($J/m^2 \times 10^2$) 24 hour boil | Sag (mm) |
|---|---|---|---|---|---|---|---|---|
| 61 | Diglycidyl ether of cyclohexane dimethanol (MK-107, Wilmington Chemical Co.) | 60 | 16.4 | 12.4 | 11.2 | ≧114 | ≧114 | 10 |
| 62 | Diglycidyl ether of resorcinol (WC-69, Wilmington Chemical Co.) | 83 | 16.4 | 10.3 | 12.1 | ≧114 | ≧114 | 8 |
| 63 | P—tert-butylphenyl glycidyl ether (WC-65, Wilmington Chemical Co.) | 47 | 14.6 | 11.1 | 8.2 | ≧114 | ≧114 | 8 |
| 64 | Vegetable oil polyglycidyl ether (WC-85, Wilmington Chemical Co.) | 45 | 14.6 | 5.7 | — | ≧114 | 73.2 | 7 |
| 65 | Cresyl glycidyl ether Epotuf ™-37053, Reichold Chemical Co.) | 47 | 15.7 | 12.6 | 6.0 | ≧114 | ≧114 | 9 |
| 66 | Diglycidyl ether of neopentyl glycol (Epotuf ™ 37054, Reichold Chemical Co.) | 36 | 15.5 | 3.6 | — | ≧114 | 22.8 | 12 |
| 67 | Triglycidyl ether of trimethylol ethane (Epi-Rez 5044, Celanese Corp.) | 56 | 15.7 | 1.4 | — | ≧114 | 38.1 | 13 |
| 68 | Triglycidyl ether of trimethylol propane (Epi-Rez ™ 5048, Celanese Corp.) | 62 | 15.6 | 5.8 | — | ≧114 | 28.9 | 13 |
| 69 | Triglycidyl p-amino phenol (ERL-0510, Ciba-Geigy Corp.) | 80 | 16.2 | 12.4 | 12.8 | ≧114 | ≧114 | 7 |
| 70 | Polyglycidylether (DER-736, Dow Chemical Co.) | 58 | 16.3 | 3.8 | — | ≧114 | 52.9 | 9 |
| 71 | N,N'-diglycidyl aniline Lekutherm. ™ x-50, Mobay Chemical Co.) | 92 | 15.4 | 12.0 | — | ≧114 | 104.6 | 9 |
| 72 | N,N,N',N'—tetraglycidyl meta-xylene diamine (PGA-X, Sherwin-Williams Co.) | 148 | 16.2 | 13.4 | — | ≧114 | ≧114 | 9 |

EXAMPLES 73-77

In Examples 73-77 compositions were prepared as in Examples 61-63 and 65 respectively, except that the amount of Cab-O-Sil ™ TS 720 was increased to 4 parts by weight and in Example 77 a composition was prepared as in Example 61, except the aluminum powder was reduced to 12.5 parts by weight and the Cab-O-Sil TS-720 was reduced to 3.5 parts by weight. Each composition was tested for press-flow value, sag, lap shear strength, and impact strength. The results are shown in Table 9. As can be seen from the data in Table 9, an increase in the amount of the flow control agent or a reduction in the amount of the aluminum powder filer provides improved sag resistance over that of Examples 61-63 and 65.

TABLE 9

| Ex. | Diluent | Press flow value (sec.) | Lap shear strength (MPa) Initial | Lap shear strength (MPa) 24 hour boil | Impact strength ($J/m^2 \times 10^2$) Initial | Impact strength ($J/m^2 \times 10^2$) 24 hour boil | Sag (mm) |
|---|---|---|---|---|---|---|---|
| 73 | MK-107 | 65 | 15.6 | 7.1 | ≧114 | 65 | 0 |
| 74 | WC-69 | 90 | 14.6 | 11.2 | ≧114 | ≧114 | 0 |
| 75 | WC-65 | 80 | 14.3 | 9.7 | ≧114 | ≧114 | 0 |
| 76 | Epotuf-37053 | 70 | 14.8 | 10.8 | ≧114 | ≧114 | 0 |
| 77 | MK-107 | 46 | 16.2 | 1.8 | 110 | 53 | 3 |

Various modifications and alterations of this invention will become apparent to those skilled in the art without departing from the scope of this invention.

We claim:

1. Storage-stable, thermally-curable, one-part epoxy resin compositions comprising a curable glycidyl ether epoxide resin; a curative amount of an aliphatic or non-aromatic cyclic polyol having about 2 to 18 carbon atoms, at least two hydroxy groups of said polyol being primary or secondary, and said polyol being free of strong acid groups and free of electron-withdrawing substituents and large groups which cause steric hindrance in the α-position in relation to the carbon atoms attached to the methylol groups of the polyol; and a catalytic amount of an imidazole compound selected from (a) compounds represented by the formula

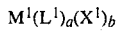

where $M^1$ is $Ni^{++}$, $Cu^{++}$, or $Co^{++}$,
$L^1$ is

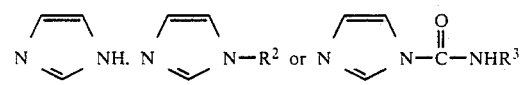

where $R^2$ is alkyl having 1 to 18 carbon atoms, cyanoalkyl having 1 to 4 carbon atoms, phenyl, or substituted phenyl, and $R^3$ is alkylene having 1 to 18 carbon atoms, phenyl, or substituted phenyl, $X^1$ is $-R^4(COO^-)_2$ where $R^4$ is phenyl, naphthyl, or $C_mH_{2m-1}$ where m is 0, 1, or 2, or $X^1$ is $-R^5(COO^-)_e$ where $R^5$ is phenyl or naphthyl and e is 3, 4, or 5, or $X^1$ is an anion of a strong inorganic acid, a is 2, 4 or 6, and b is 0.5, 0.67, 1, or 2 depending on the valence of $X^1$;

(b) compounds represented by the formula $L^2X^2$ where $L^2$ is

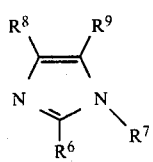

where $R^6$ is $-H, -C_nH_{2n+1}$ or

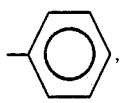

n being a number of from 1 to 16, $R^7$ is $-H, -CH_3, -C_2H_5, -C_2H_4CN$, or

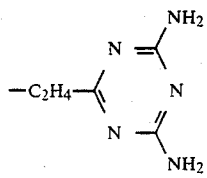

$R^8$ is $-H, -CH_3, -C_2H_5, -CH_2OH$, or

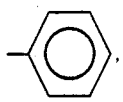

$R^9$ is $-H$ or $-CH_2OH$ $X^2$ is $-R^4(COOH)_2$ where $R^4$ is phenyl, naphthyl, or $C_mH_{2m-1}$ where m is 0, 1, or 2, or $X^2$ is $-R^5(COOH)_e$ where $R^5$ is phenyl or naphthyl and e is 3, 4, or 5, or $X^2$ is isocyanuric acid;

(c) compounds represented by the formula $M^3(L^3)_e$ where $M^3$ is $Ni^{++}, Cu^{++}, Co^{++}, Zn^{++}, Cu^+$, or $Ag^+$, $L^3$ is

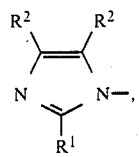

where $R^1$ is $-H$,

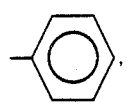

or $C_nH_{2n+1}$, n being a number of from 1 to 16, and each $R^2$ is $-CH_3$,

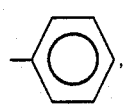

or $-CH_2OH$, e is 1 or 2; and (d) a compound represented by the formula

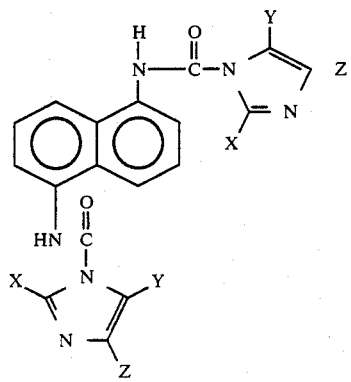

wherein X, Y and Z may be the same or different, and each may be hydrogen, a lower alkyl or aryl having 1-12 carbon atoms, halo or nitro, and said imidazole being insoluble in said epoxide resin at temperatures of about 25° to 35° C.; and said resin composition having a pot life of at least 3 days at 22° C. and at least 12 hours at 35° C.

2. The composition of claim 1 wherein the hydroxyl to epoxide ratio is about 0.5:1 to 1:1.

3. The composition of claim 1 wherein the hydroxyl to epoxide ratio is about 0.7:1 to 0.8:1.

4. The composition of claim 1 wherein said polyol is trimethylol ethane.

5. The composition of claim 1 wherein said imidazole comprises about 1 to 10 weight percent of the composition.

6. The composition of claim 1 wherein said imidazole is nickel imidazole phthalate.

7. The composition of claim 1 further comprising at least one toughening agent.

8. The composition of claim 7 wherein said toughening agent comprises about 8 to 34 weight percent of the composition.

9. The composition of claim 7 comprising a carboxyl-terminated butadiene acrylonitrile toughening agent and a core-shell polymer toughening agent.

10. The composition of claim 1 further comprising a flow control agent.

11. The composition of claim 10 wherein said composition has a maximum sag of less than about 2 mm.

12. The composition of claim 1 further comprising a reactive diluent.

13. The composition of claim 12 wherein said composition has a press-flow value of less than about 100 sec.

14. The composition of claim 1 further comprising filler.

15. The composition of claim 14 wherein said filler is aluminum powder.

16. The composition of claim 1 wherein said composition has a reactivity of less than 10 minutes at 137° C.

17. The composition of claim 1 wherein said epoxide is the diglycidyl ether of bisphenol A.

18. The composition of claim 1 wherein said composition comprises
   30 to 50 parts by weight of the diglycidyl ether of bisphenol A;
   10 to 20 parts by weight of an adduct of a carboxyl-terminated butadiene acrylonitrile toughening agent and the diglycidyl ether of bisphenol A;
   3 to 10 parts by weight of an acrylic core-shell graft polymer;
   a sufficient amount of said polyol to provide a hydroxy to epoxide ratio of about 0.5:1 to 1:1;
   2 to 5 parts by weight of said imidazole; and
   10 to 50 parts by weight of a filler.

19. Storage-stable, thermally-curable, one-part epoxy resin compositions comprising a curable epoxide resin; a curative amount of an aliphatic or non-aromatic cyclic polyol having about 2 to 18 carbon atoms, at least two hydroxy groups of said polyol being primary or secondary, and said polyol being free of strong acid groups, and free of electron-withdrawing substituents and large groups which cause steric hindrance in the $\alpha$-position in relation to the carbon atoms attached to the methyol groups of the polyol; and a catalytic amount of an imidazole compound selected from (a) compounds represented by the formula $$M^1(L^1)_a(X^1)_b$$

where $M^1$ is $Ni^{++}$, $Cu^{++}$, or $Co^{++}$,
$L^1$ is

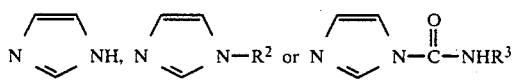

where $R^2$ is alkyl having 1 to 18 carbon atoms, cyanoalkyl having 1 to 4 carbon atoms, phenyl, or substituted phenyl, and $R^3$ is alkylene having 1 to 18 carbon atoms, phenyl, or substituted phenyl,
$X^1$ is $-R^4(COO^-)_2$ where $R^4$ is phenyl, naphthyl, or $C_mH_{2m-1}$
where m is 0, 1, or 2, or
$X^1$ is $-R^5(COO^-)_e$
where $R^5$ is phenyl or naphthyl
and e is 3, 4, or 5, or
$X^1$ is an anion of a strong inorganic acid,
a is 2, 4 or 6, and
b is 0.5, 0.67, 1, or 2 depending on the valence of $X^1$;

(b) compounds represented by the formula $$L^2X^2$$

where $L^2$ is

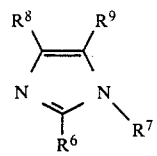

where $R^6$ is $-H, -C_nH_{2n+1}$ or

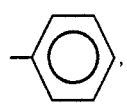

n being a number of from 1 to 16,
$R^7$ is $-H, -CH_3, -C_2H_5, -C_2H_4CN$, or

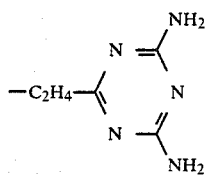

$R^8$ is $-H, -CH_3, -C_2H_5, -CH_2OH$, or

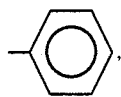

$R^9$ is $-H, -CH_2OH$
$X^2$ is $-R^4(COOH)_2$ where $R^4$ is phenyl, naphthyl, or $C_mH_{2m-1}$
where m is 0, 1, or 2, or
$X^2$ is $-R^5(COOH)_e$
where $R^5$ is phenyl or naphthyl
and e is 3, 4, or 5, or
$X^2$ is isocyanuric acid;

(c) compounds represented by the formula $$M^3(L^3)_e$$

where $M^3$ is $Ni^{++}$, $Cu^{++}$, $Co^{++}$, $Zn^{++}$, $Cu^+$, or $Ag^+$,
$L^3$ is

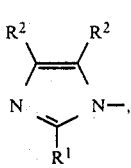

where $R^1$ is $-H$,

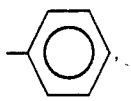

or $C_nH_{2n+1}$, n being a number of from 1 to 16, and each $R^2$ is —$CH_3$,

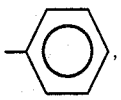

or —$CH_2OH$, e is 1 or 2;

(d) compounds represented by the formula $L^4$ where $L^4$ is

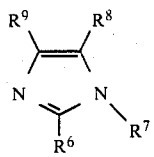

where $R^6$, $R^7$, $R^8$ and $R^9$ are the same as for compound (b); and (e) a compound represented by the formula

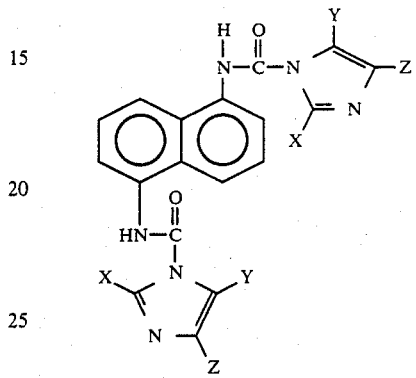

wherein X, Y and Z may be the same or different, and each may be hydrogen, a lower alkyl or aryl having 1–12 carbon atoms, halo or nitro said composition having a hydroxyl to epoxide ratio of about 0.7:1 to 0.8:1.

20. The composition of claim 1 wherein said polyol is insoluble in said epoxide.

* * * * *

UNITED STATES PATENT AND TRADEMARK OFFICE
CERTIFICATE OF CORRECTION

PATENT NO. : 4,772,645

DATED : September 20, 1988

INVENTOR(S) : KENT S. TARBUTTON, JANIS ROBINS & JOHN C. TANGEN

It is certified that error appears in the above-identified patent and that said Letters Patent is hereby corrected as shown below:

Col. 3, lines 1 & 2, "$Ni^{--}$, $Cu^{--}$, $Co^{--}$, $Zn^{--}$, $Cu^{--}$, or $Ag^{-}$, should be -- $Ni^{++}$, $Cu^{++}$, $Co^{++}$, $Zn^{++}$, $Cu^{+}$, or $Ag^{+}$, -- .

Col. 15, line 13, Ex. 38 "ethyl-s-" should be -- ethyl-s-triazine -- .

Col. 21, line 41, "methyol" should be -- methylol -- .

Signed and Sealed this

Sixteenth Day of January, 1990

*Attest:*

JEFFREY M. SAMUELS

*Attesting Officer*      *Acting Commissioner of Patents and Trademarks*